United States Patent
Smith

(10) Patent No.: US 7,412,794 B2
(45) Date of Patent: Aug. 19, 2008

(54) MEASURING DEVICE FOR USE WITH FISHING POLE

(76) Inventor: Robert W. Smith, 120 Stanley Ave., Nutley, NJ (US) 07110

( * ) Notice: Subject to any disclaimer, the term of this patent is extended or adjusted under 35 U.S.C. 154(b) by 0 days.

(21) Appl. No.: 11/231,602

(22) Filed: Sep. 21, 2005

(65) Prior Publication Data

US 2006/0059765 A1   Mar. 23, 2006

Related U.S. Application Data

(60) Provisional application No. 60/612,290, filed on Sep. 22, 2004.

(51) Int. Cl.
*A01K 87/08* (2006.01)
*A01K 97/00* (2006.01)

(52) U.S. Cl. .................. 43/23; 43/25; 33/511; 33/758; 33/760; 33/761; 33/769

(58) Field of Classification Search .............. 43/25, 43/18.1 R, 4, 23; 33/755, 758–761, 769 33/511; 220/475
See application file for complete search history.

(56) References Cited

U.S. PATENT DOCUMENTS

| | | | | |
|---|---|---|---|---|
| 10,795 | A | * | 4/1854 | De Saxe .................. 43/18.1 R |
| 111,327 | A | * | 1/1871 | Dillingham .................. 33/760 |
| 163,410 | A | * | 5/1875 | Reisinger ..................... 33/761 |
| 166,099 | A | * | 7/1875 | Hastings ...................... 33/760 |
| 309,483 | A | * | 12/1884 | Millner ........................ 33/760 |
| 310,840 | A | * | 1/1885 | Millner ........................ 33/760 |
| 461,106 | A | * | 10/1891 | Oberly .................... 43/18.1 R |
| 465,254 | A | * | 12/1891 | Felker .................... 43/18.1 R |
| 568,473 | A | * | 9/1896 | Brewer ......................... 33/760 |
| 648,505 | A | * | 5/1900 | Lindbohm ............... 43/18.1 R |
| 831,150 | A | * | 9/1906 | Fraser .............................. 43/25 |
| 1,010,319 | A | * | 11/1911 | Robertson ..................... 33/760 |
| 1,113,847 | A | * | 10/1914 | Turner ............................ 43/25 |
| 1,174,526 | A | * | 3/1916 | Stoddart .................. 43/18.1 R |
| 1,255,269 | A | * | 2/1918 | Zinkiewiez .............. 43/18.1 R |
| 1,271,073 | A | * | 7/1918 | Patten ............................ 43/23 |
| 1,518,205 | A | * | 12/1924 | Kountz ........................... 43/23 |
| 1,719,838 | A | * | 7/1929 | Haselton ........................ 43/23 |
| 1,836,034 | A | * | 12/1931 | Luchansky .............. 43/18.1 R |
| 1,963,326 | A | * | 6/1934 | Greenwood ................. 242/406 |
| 1,964,425 | A | * | 6/1934 | Bowman ....................... 43/23 |
| 2,003,893 | A | * | 6/1935 | La Pan .......................... 43/25 |
| 2,085,654 | A | * | 6/1937 | Harris ............................ 43/25 |
| 2,144,122 | A | * | 1/1939 | Pflueger ........................ 43/25 |
| 2,205,769 | A | * | 6/1940 | Sweetland ..................... 43/23 |

(Continued)

FOREIGN PATENT DOCUMENTS

GB      2396542 A   *   6/2004

(Continued)

*Primary Examiner*—Darren W Ark
(74) *Attorney, Agent, or Firm*—McCarter & English, LLP

(57) ABSTRACT

The present invention relates to tape measure apparatus including an adapter having a first portion, which is sized and shaped so as to be attached to a butt end of a fishing pole, and a second portion, which is attached to the first portion. The tape measure apparatus is provided with a tape measure device sized and shaped such that the tape measure device can be removably attached to the adapter. In this manner, conventional fishing poles can be retrofitted with the tape measure device.

17 Claims, 5 Drawing Sheets

U.S. PATENT DOCUMENTS

| | | | | |
|---|---|---|---|---|
| D128,132 | S * | 7/1941 | Bell | 43/23 |
| 2,479,021 | A * | 8/1949 | Perkins | 43/23 |
| 2,528,799 | A * | 11/1950 | Strong | 43/25 |
| 2,642,693 | A * | 6/1953 | Broady | 43/23 |
| 2,678,817 | A * | 5/1954 | Mitton | 177/245 |
| 2,750,184 | A * | 6/1956 | Warndahl | 43/25 |
| 2,765,535 | A * | 10/1956 | Weber | 43/25 |
| 2,853,724 | A * | 9/1958 | Smith | 43/23 |
| 2,885,817 | A * | 5/1959 | Carter | 43/25 |
| 2,914,881 | A * | 12/1959 | Williams | 43/23 |
| 2,997,042 | A * | 8/1961 | Mitchell | 43/25 |
| 3,006,098 | A * | 10/1961 | Harke | 43/23 |
| 3,073,055 | A * | 1/1963 | Edwards et al. | 43/23 |
| 3,276,490 | A * | 10/1966 | Johansson | 33/755 |
| 3,302,320 | A * | 2/1967 | Breeden | 43/18.1 R |
| 3,324,589 | A * | 6/1967 | Makino et al. | 43/18.1 R |
| 3,479,742 | A * | 11/1969 | Starkenberg | 33/761 |
| 3,803,742 | A * | 4/1974 | Foster | 43/4 |
| 3,830,006 | A * | 8/1974 | Garbolino | 43/25 |
| 3,982,294 | A * | 9/1976 | Hicken | 43/25 |
| 3,992,799 | A * | 11/1976 | Oakes | 43/25 |
| 4,014,129 | A * | 3/1977 | Capra | 43/25 |
| 4,020,581 | A * | 5/1977 | Genovese | 43/23 |
| 4,084,343 | A * | 4/1978 | Genovese | 43/23 |
| 4,228,590 | A * | 10/1980 | Kimura | 33/769 |
| 4,301,611 | A * | 11/1981 | Lapinski | 43/18.1 R |
| 4,443,944 | A * | 4/1984 | Beesley | 33/761 |
| 4,467,548 | A * | 8/1984 | Tabor | 43/23 |
| 4,646,461 | A * | 3/1987 | McLeod | 43/23 |
| 4,796,373 | A * | 1/1989 | Struntz | 43/23 |
| 4,869,011 | A * | 9/1989 | Whiting et al. | 43/23 |
| 4,969,286 | A * | 11/1990 | Belanger | 43/25 |
| 4,976,037 | A * | 12/1990 | Hines | 33/759 |
| 4,995,188 | A * | 2/1991 | Ewing | 43/23 |
| 5,119,521 | A * | 6/1992 | Clontz | 33/760 |
| 5,203,104 | A * | 4/1993 | Brauer | 43/23 |
| 5,263,275 | A * | 11/1993 | Rumbaugh | 43/23 |
| 5,339,532 | A * | 8/1994 | O'Keefe | 43/4 |
| 5,355,611 | A * | 10/1994 | Dahlberg et al. | 43/25 |
| 5,442,866 | A * | 8/1995 | Woods | 33/760 |
| 5,483,768 | A * | 1/1996 | Tessier | 43/16 |
| 5,517,786 | A * | 5/1996 | Peissig | 43/18.1 R |
| 5,539,994 | A * | 7/1996 | Milden | 33/760 |
| 5,548,917 | A * | 8/1996 | Holwadel | 33/511 |
| 5,551,184 | A * | 9/1996 | Grosse | 43/25 |
| 5,555,589 | A * | 9/1996 | Moultrie | 33/760 |
| 5,568,698 | A * | 10/1996 | Harding et al. | 43/53.5 |
| 5,637,838 | A * | 6/1997 | Arey et al. | 33/767 |
| 5,950,346 | A * | 9/1999 | da Rosa | 43/25 |
| 6,115,955 | A * | 9/2000 | Sledge | 43/23 |
| 6,382,490 | B1 * | 5/2002 | Divincenzo | 43/54.1 |
| 6,446,378 | B1 * | 9/2002 | Welch et al. | 43/11 |
| 6,581,318 | B1 * | 6/2003 | Lu | 43/23 |
| 6,671,993 | B1 * | 1/2004 | Routt | 43/25 |
| 7,076,910 | B1 * | 7/2006 | Xifra | 43/4 |
| 2002/0073601 | A1 * | 6/2002 | DeSorcy | 43/25 |
| 2004/0040196 | A1 * | 3/2004 | Schwartz | 43/11 |
| 2004/0049967 | A1 * | 3/2004 | DeSorcy | 43/25 |

FOREIGN PATENT DOCUMENTS

| | | | |
|---|---|---|---|
| JP | 2000-316427 A | * | 11/2000 |
| JP | 2001-333664 A | * | 12/2001 |

* cited by examiner

MEASURING DEVICE FOR USE WITH FISHING POLE

CROSS-REFERENCE TO RELATED APPLICATION

The present application claims the benefit of U.S. Provisional Application No. 60/612,290 filed Sep. 22, 2004, the disclosure of which is incorporated herein by reference in its entirety.

FIELD OF THE INVENTION

The present invention relates to a measuring device for use with a fishing pole and, more particularly, to a measuring device adapted to be removably attached to a butt end of a fishing pole.

BACKGROUND OF THE INVENTION

In the past, fishing poles equipped with measuring devices have been developed (see, for instance, U.S. Pat. Nos. 461,106, 1,255,269, 1,271,073, 2,003,893, 2,750,184, 2,914,881, 4,969,286 and 4,995,188). These measuring devices, some of which are in the form of a tape measure, are useful for measuring the length of the fish that has been caught. However, because the fishing poles are specifically constructed for accommodating the corresponding measuring devices, it has been difficult to retrofit conventional fishing poles (i.e., fishing poles equipped without measuring devices) with such measuring devices.

SUMMARY OF THE INVENTION

The present invention overcomes the disadvantages and shortcomings of the prior art discussed above by providing tape measure apparatus including an adapter having a first portion, which is sized and shaped so as to be attached to a butt end of a fishing pole, and a second portion, which is attached to the first portion. The tape measure apparatus also includes a tape measure device sized and shaped such that the tape measure device can be removably attached to the adapter. In this manner, conventional fishing poles can be retrofitted with the tape measure device.

In accordance with another feature of the present invention, a fishing pole assembly is provided, including a fishing pole having a butt end. The assembly also includes an adapter having a first portion attached to the butt end of the fishing pole, and a second portion, which includes an opening therein. A tape measure device has at least one portion which is removably retained in the opening of the adapter.

BRIEF DESCRIPTION OF THE DRAWINGS

For a more complete understanding of the present invention, reference is made to the following detailed description of exemplary embodiments considered in conjunction with the accompanying drawings, in which.

It should be noted that for simplicity and clarity of illustration, elements shown in the accompanying drawings have not necessarily been drawn to scale. For example, the dimensions of some of the elements are exaggerated relative to one other for clarity.

DETAILED DESCRIPTION OF THE EXEMPLARY EMBODIMENTS

Figures 1, 2:
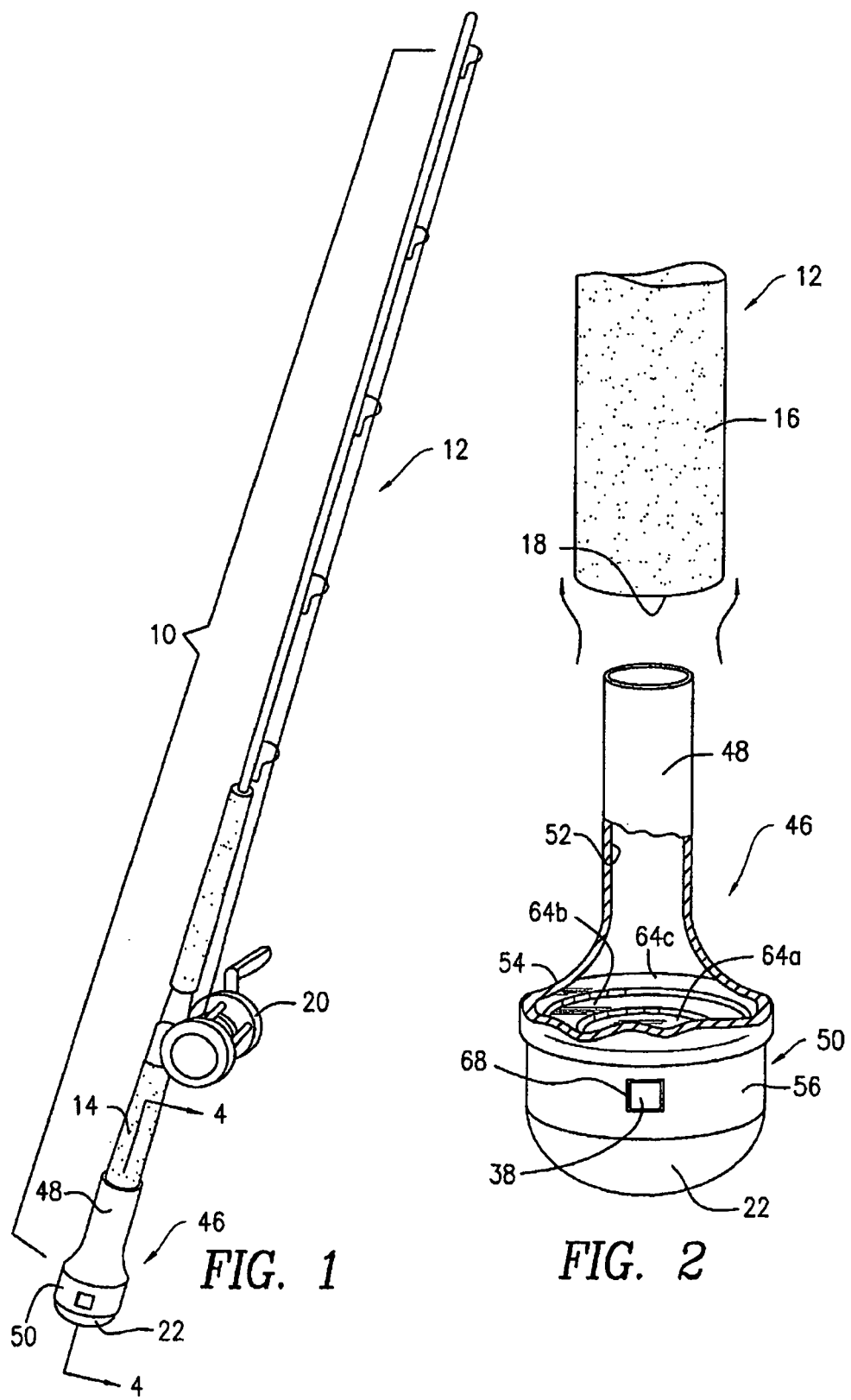
FIG. 1 is a perspective view of a fishing pole which is equipped with a butt cap/measuring device assembly constructed in accordance with a first embodiment of the present invention.
FIG. 2 is a perspective, partially broken-away view of the butt cap/measuring device assembly shown in FIG. 1.

FIG. 1 illustrates a fishing pole assembly 10 including a fishing pole 12 which has a conventional construction. More particularly, the fishing pole 12 is provided with a handle portion 14 having a butt end section 16 which includes an end 18 (see FIG. 2). As is conventional, a reel 20 is mounted to the fishing pole 12.

Figure 3:
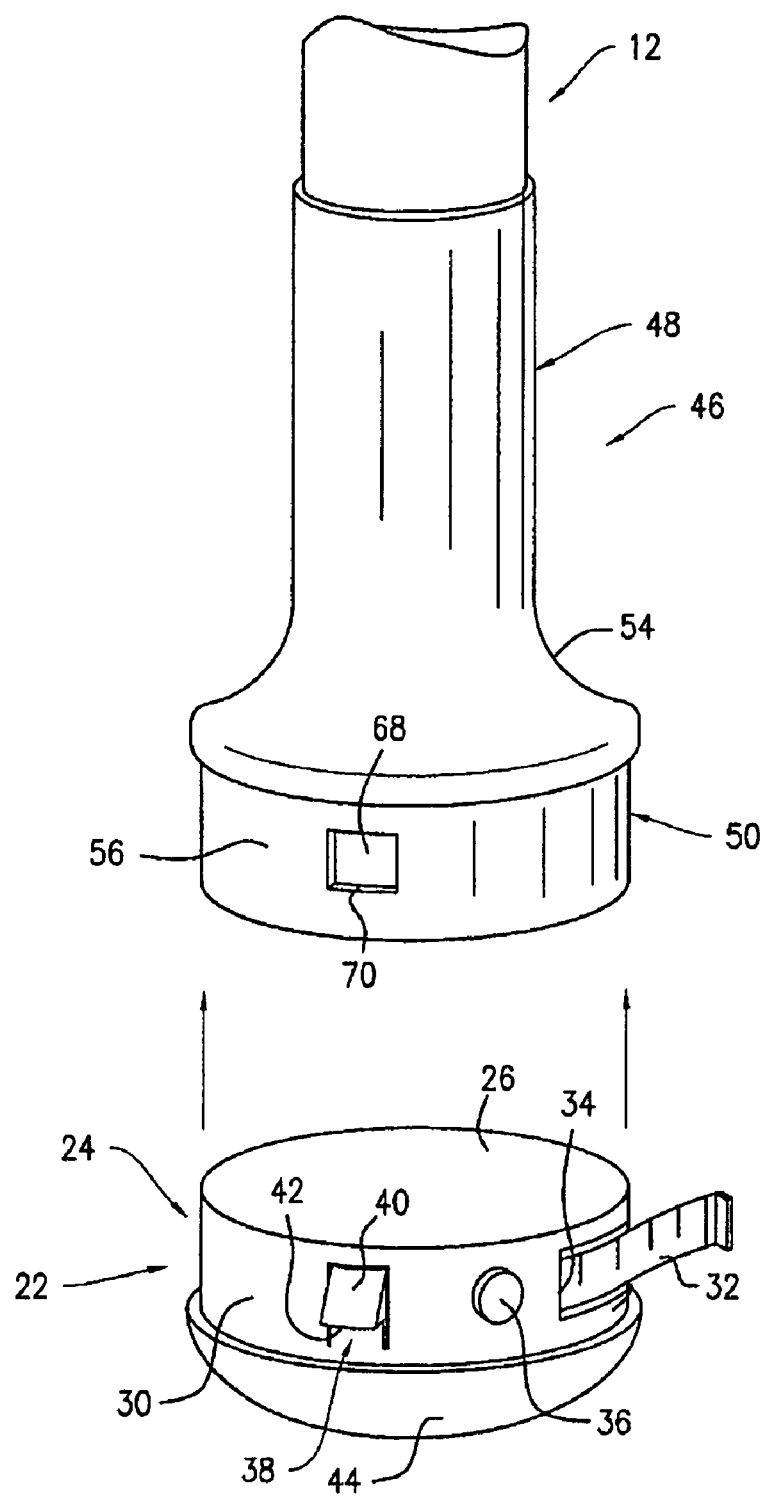
FIG. 3 is a perspective, exploded view of the butt cap/measuring device assembly shown in FIGS. 1 and 2.
Figure 4:
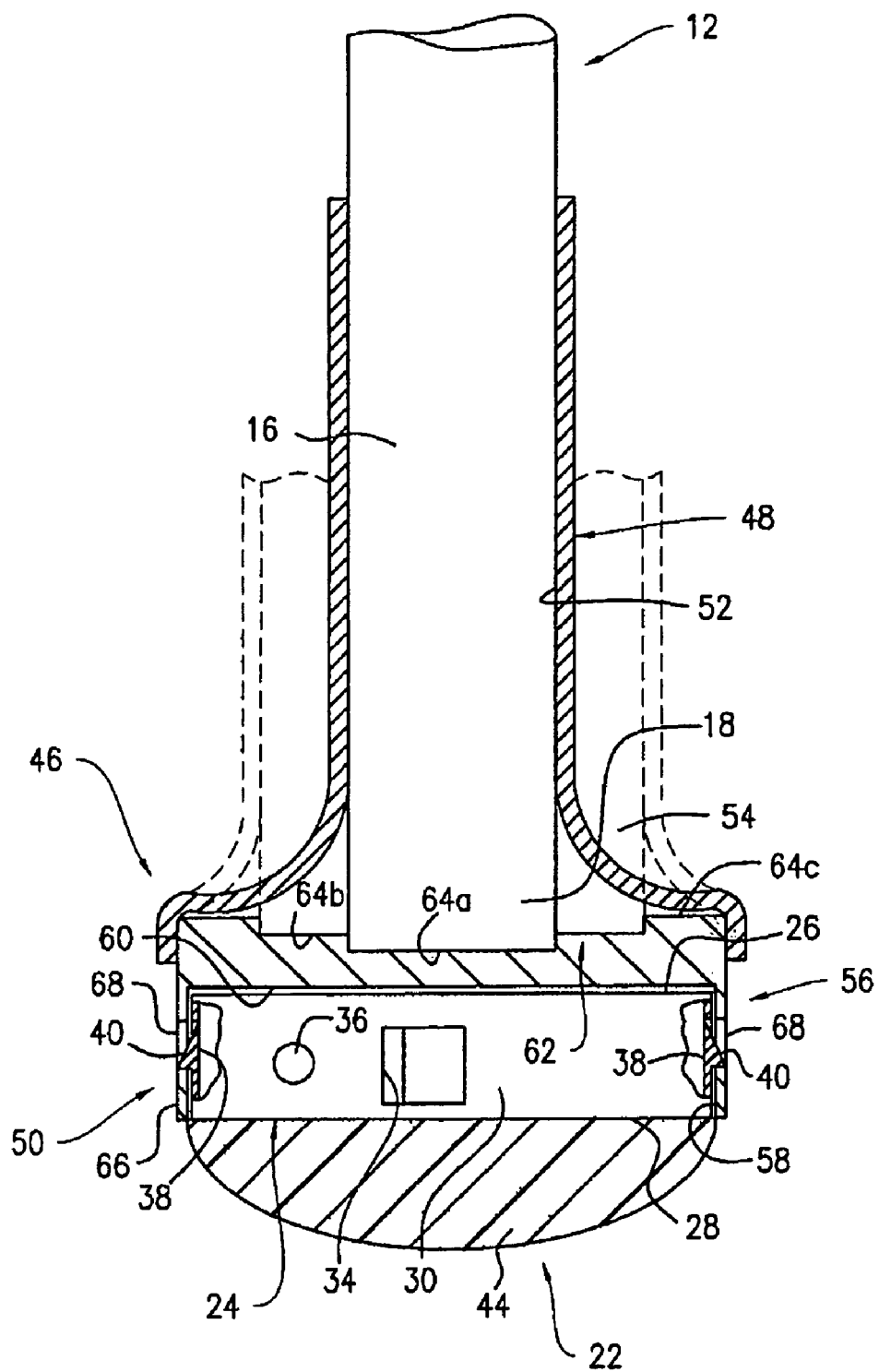
FIG. 4 is a cross-sectional view, taken along section line 4-4 and looking in the direction of the arrows, of the butt cap/measuring device assembly shown in FIG. 1.

With reference to FIGS. 2-4, the fishing pole assembly 10 includes a tape measure unit (i.e., measuring device) 22 mounted to the butt end section 16 of the fishing pole 12. The tape measure unit 22 has a housing 24 having a disk-like shape and equipped with a pair of opposing, substantially circular end walls 26, 28 (see FIGS. 3 and 4) and a cylindrical side wall 30 extending between the end walls 26, 28. The tape measure unit 22 is also provided with a tape measure 32 (see FIG. 3) which is wound within the housing 24 in a conventional manner such that it can be extended outwardly from, and retracted into, the housing 24 through a hole 34 formed in the side wall 30. A release button or knob 36 is provided on the housing 24 so as to cause the tape measure 32 to retract into the housing 24 when the tape measure 32 is pulled outwardly from the housing 24. Locking tabs 38 are formed on opposing sides of the side wall 30 of the housing 24, each having a locking member 40 with a locking edge 42 and each being deflectable radially inwardly for purposes to be discussed hereinafter.

Referring primarily to FIGS. 3 and 4, a buoyant member 44 is also attached to the end wall 28 of the housing 24. The buoyant member 44 is provided such that when the tape measure unit 22 is accidentally dropped in water, the buoyant member 44 causes the tape measure unit 22 to float to the water surface. The buoyant member 44 also functions as a protective device for the tape measure unit 22. The buoyant member 44 can be made in any conventional manner. For instance, the buoyant member 44 can be made from "Styrofoam" material or can be made as an enclosed single cell filled with air or other buoyant materials. The buoyant member 44 has a diameter slightly larger than the diameter of the housing 24.

Referring now to FIGS. 1-4, a butt cap (i.e., an adapter) 46 is provided for removably attaching the tape measure unit 22 to the end 18 of the fishing pole 12. The butt cap 46 includes a sleeve 48 and a receptacle 50 depending therefrom. The sleeve 48 has an opening 52 (see FIGS. 2 and 4) extending therethrough for receiving the butt end section 16 of the fishing pole 12. The sleeve 48 is also provided with an flaring end 54 which is fixedly attached to the receptacle 50. For instance, the flaring end 54 can be put over an upper end of the receptacle 50 and secured thereto by a conventional mechanism (e.g., stapling, gluing, etc.). The rest of the sleeve 48 has a cylindrical shape and normally has a diameter which is smaller than the diameter of the butt end section 16 of the fishing pole 12 (see FIG. 2). The entire sleeve 48 is made from a conventional elastic, resilient material (e.g., elastic foam, rubber, elastomer, etc.) such that it can be stretched or expanded radially outwardly so as to enlarge the diameter or size of the opening 52 for receiving the butt end section 16 of the fishing pole 12 as will be discussed in greater detail hereinbelow.

With reference to FIGS. 3 and 4, the receptacle 50, which is rigid, includes an inverted cup-shaped body 56 which is equipped with an opening 58 for receiving the housing 24 of the tape measure unit 22. The opening 58 of the receptacle 50 has a diameter which is smaller than the diameter of the buoyant member 44 such that it can be closed off by the buoyant member 44 when the housing 24 of the tape measure unit 22 is received in the receptacle 50 (see FIG. 4). In this manner, the buoyant member 44 inhibits external elements, such as dirt, sand, etc., from getting into the opening 58, thereby protecting the tape measure unit 22 from such elements.

The receptacle 50 is also provided with an upper wall 60 defining a platform 62 which has a stepped construction for supporting the end 18 of the fishing pole 12 (see FIG. 4). The platform 62 is provided with a plurality of substantially circular, concentric recesses 64a, 64b (see FIGS. 2 and 4), each of which is provided with a different size such that the butt cap 46 can accommodate numerous fishing poles having different buff end sizes or diameters. More particularly, the recess 64a is adapted to receive and support an end of a fishing pole having a relatively common size or diameter (e.g., 1 inch), while the recess 64b is adapted to receive and support an end of a fishing pole having a slightly larger diameter (e.g., 1⅛ to 1¼ inch). The platform 62 also has an annularly shaped supporting surface 64c (see FIGS. 2 and 4) which surrounds the recess 64b and which is adapted to support an end of a fishing pole having a relatively larger butt end diameter (i.e., a size larger than the size of the recess 64b; e.g., 1.5 inch or larger). In this manner, the receptacle 50 is adapted for use with commercially available fishing poles. It is noted that the recesses 64a, 64b and/or the supporting surface 64c are drawn out of scale in FIGS. 2 and 4 for illustration purposes.

Still referring to FIGS. 3 and 4, the body 56 of the receptacle 50 includes an annular skirt 66 depending from the upper wall 60 and having a pair of diametrically opposed locking holes 68. More particularly, each of the locking holes 68 has a locking edge 70 for releasably interlocking with the edge 42 of a corresponding one of the locking tabs 38 of the tape measure unit 22. In this manner, the tape measure unit 22 can be removably secured to the butt cap 46 and hence the fishing pole 12.

In order to mount the butt cap 46 to the butt end section 16 of the fishing pole 12, the sleeve 48 is stretched in a radially outward direction either by hand or with a conventional expanding tool such that the diameter of the opening 52 of the sleeve 48 is enlarged sufficiently so as to receive the butt end section 16. The butt end section 16 is then inserted into the opening 52 of the sleeve 48 until the end 18 of the fishing pole 12 abuts the platform 62 of the receptacle 50 and is properly seated in one of the recesses 64a, 64b or on the supporting surface 64c. If the fishing pole 12 originally came with a conventional butt cap as is typically done in the fishing pole industry, such a butt cap needs to be removed from the fishing pole 12 prior to the mounting of the butt cap 46 of the present invention to the fishing pole 12. After the end 18 of the fishing pole 12 has been properly seated in one the recesses 64a, 64b or the supporting surface 64c, the sleeve 48 is released and is thereby allowed to contract radially inwardly. Because the diameter of the sleeve 48 in its fully contracted shape is smaller than the diameter of the butt end section 16 of the fishing pole 12 (see FIG. 2), the butt end section 16 is gripped tightly by the sleeve 48 (i.e., the sleeve 48 is fitted tightly over the butt end section 16) such that it is inhibited from moving axially or laterally relative to the butt cap 46 (see FIG. 4). In this manner, the butt cap 46 can be securely attached to the fishing pole 12.

In order to facilitate the mounting of the butt cap 46 to the fishing pole 12, the elastic sleeve 48 can be provided in the form of a roll (i.e., the sleeve 48 can be pre-rolled upon itself so as to form a roll). In this manner, the sleeve 48 can be simply unrolled upon the butt end section 16 of the fishing pole 12 in order to attach the butt cap 46 to the fishing pole 12. The butt cap 46 can also be dismounted from the fishing pole 12 by rolling the sleeve 48 upon itself.

Once the butt cap 46 is properly attached to the fishing pole 12, the tape measure unit 22 can be removably mounted in the receptacle 50. More particularly, with the buoyant member 44 being gripped by a user's hand, the tape measure unit's housing 24 is inserted into the opening 58 of the receptacle 50 such that each of the locking members 40 can click into a corresponding one of the locking holes 68. More particularly, the edge 42 of each of the locking tabs 38 releasably engages the edge 70 of a corresponding one of the locking holes 68, thereby securing the tape measure unit 22 to the receptacle 50. The tape measure unit 22 can be removed from the receptacle 50 and hence from the fishing pole 12 by pushing or deflecting the locking tabs 38 radially inwardly so as to disengage same from the locking holes 68. Once removed from the butt cap 46, the tape measure unit 22 can be used to measure many different items, including a fish caught by a fisherman.

It should be appreciated that the present invention provides numerous advantages over the prior art discussed above. For instance, because the butt cap 46 is adapted to accommodate a number of fishing poles having different butt end diameters, the tape measure unit 22 can be used in conjunction with such fishing poles without making any structural changes thereto. More particularly, the platform 62 is adapted to engage and support butt ends of fishing poles having different diameters (see the fishing pole shown in broken line representation in FIG. 4). Likewise, the sleeve 48, due to its elasticity, is adapted to receive and grip butt end sections of fishing poles having varying diameters (see the broken line representation of the sleeve 48 in FIG. 4). As a result, the butt cap 46, and hence the tape measure unit 22, can be mounted to many differently sized fishing poles. In such circumstances, conventional fishing poles can be easily retrofitted with the butt cap 46 such that it can be equipped with the tape measure unit 22. The butt cap 46 and the tape measure unit 22 can therefore be provided to a fisherman as a kit so that he/she can retrofit his/her fishing pole. Because conventional fishing poles typically come equipped with standard butt caps, such standard butt caps need to be pulled off or otherwise removed therefrom before retrofitting with such a kit.

With reference to FIG. 4, when the tape measure unit 22 is attached to the butt cap 46, the housing 24 (i.e., the portion containing the tape measure 32) is recessed completely into the receptacle 50 such that the hole 34 is covered by the skirt 66. Moreover, the opening 58 of the receptacle 50 is closed off by the buoyant member 44. The foregoing structural/functional details of the butt cap 46 and the tape measure unit 22 protect the tape measure 32 from external elements, such as dirt, debris, sand, etc.

Still referring to FIG. 4, the tape measure unit 22 is attached to the fishing pole 12 in substantially flat orientation. That is, the tape measure unit 22 is oriented such that the end walls 26, 28 are substantially perpendicular to the longitudinal axis of the fishing pole 12. As a result, the tape measure unit 22 can be attached to the fishing pole 12 without significantly increasing the fishing pole's overall length.

It should be noted that the present invention can have numerous modifications and variations. For instance, the sleeve 48 can be formed as a rigid unit adapted to receive the butt end section 16 of the fishing pole 12. In such circumstances, multiple adapters having sleeves of varying sizes (e.g., 1 inch, 1¼ inch and 1½ inch) can be provided for accommodating commercially available fishing poles. Alternatively, the sleeve 48 can be provided with removable or frangible segments, each of which is specifically adapted for accommodating a fishing pole having a predetermined butt end diameter. More particularly, one or more of such segments can be broken away or otherwise removed from the sleeve 48 such that a butt end of a selected fishing pole can be inserted into and secured to the sleeve 48.

The locking tabs 38 and/or the locking holes 68 can also be replaced with any attachment mechanisms used for removably attaching one unit to another unit (e.g., an interference or friction fit mechanism, a threaded connection mechanism, a bayonet-type connector mechanism, a twist-and-lock connector mechanism, an attachment pin mechanism, etc.). In using such mechanisms, the buoyant member 44 can be utilized as a gripping surface for being gripped by a user so as to attach the tape measure unit 22 to, or removing same from, the receptacle 50. Alternatively, the buoyant member 44 can be replaced, or supplemented, with other mechanisms (e.g., fins or other gripping mechanisms formed on the housing 24).

FIGS. 5 and 6 and FIGS. 7 and 8 depict second and third embodiments, respectively, of the present invention. Elements illustrated in FIGS. 5 and 6 and FIGS. 7 and 8, which correspond, either identically or substantially, to the elements described above with respect to the embodiment of FIGS. 1-4 have been designated by corresponding reference numerals increased by one hundred and two hundred, respectively. Unless otherwise stated, the embodiments of FIGS. 5-8 are constructed, assembled and used in the same basic manner as the embodiment of FIGS. 1-4.

Figure 5:
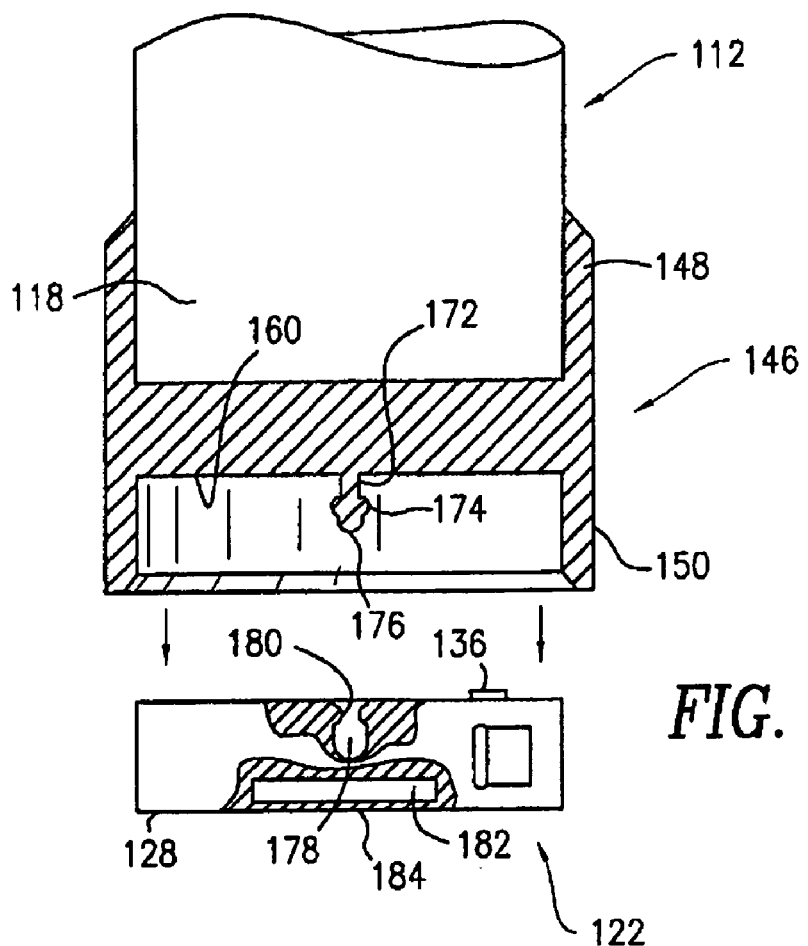
FIG. 5 is a cross-sectional view of a butt cap and a measuring device constructed in accordance with a second embodiment of the present invention.
Figure 6:
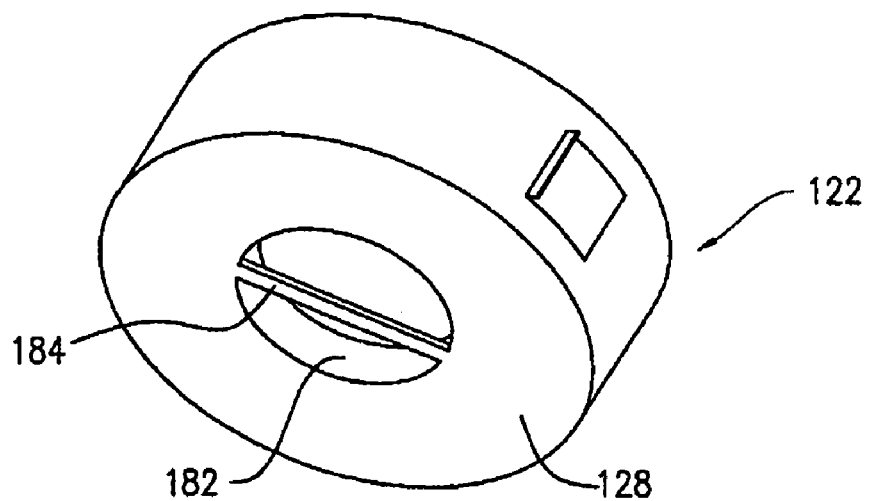
FIG. 6 is a bottom perspective view of the measuring device shown in FIG. 5.

FIGS. 5 and 6 illustrate a second embodiment of the present invention. More particularly, a butt cap 146 is provided with a rigid sleeve 148 for attachment to an end 118 of a fishing pole 112. Because the sleeve 148 is rigid, it is adapted to receive a fishing pole end having a predetermined size. As a result, multiple butt caps having different diameters can be provided for accommodating fishing poles having varying diameters. The sleeve 148 can be fitted over the end 118 of the fishing pole 112 either by way of a friction fit or by other affixing means (e.g., adhesive).

The butt cap 146 also includes a receptacle 148 formed monolithically with the sleeve 148. An attachment post 172 projects downwardly from an upper wall 160 of the receptacle 150. The post 172 is provided with a retainer 174 projecting radially outwardly therefrom, as well as a beveled tip 176.

A tape measure unit 122 includes a mounting hole 178 sized and shaped so as to receive the attachment post 172 therein. More particularly, the mounting hole 178 is provided with an annular retention ring 180 projecting radially inwardly into the mounting hole 178. The retention ring 180 of the tape measure unit 122 has an inner diameter that is smaller than the outer diameter of the retainer 174 of the attachment post 172. The retention ring 180 and/or the retainer 174 are provide sufficient elasticity/resilience such that, when the attachment post 172 is inserted into the mounting hole 178, the retainer 174 can pass beyond, and thereby snap into, the retention ring 180. As a result, the retainer 174 is retained in the mounting hole 178 by the retention ring 180 so as to secure the tape measure unit 122 to the receptacle 150. Alternatively, the retention ring 180 can be replaced with spring loaded members for engagement with the retainer 174. Moreover, the butt cap 146 and the tape measure unit 122 can be provided with a multiple set of attachment posts and mounting holes.

The tape measure unit 122 includes a recess 182 formed in an end wall 128 thereof and a bar 184 spanning the recess 182. The recess 182 is adapted to allow a user's finger to be inserted thereinto for gripping and pulling the bar 184 when the tape measure unit 122 is mounted in the receptacle 150. When the bar 184 is pulled, the retainer 174 is dislodged from the retention ring 180, thereby releasing the tape measure unit 122 from the receptacle 150. The tape measure unit 122 also includes a tape measure release button 136.

Figures 7, 8:
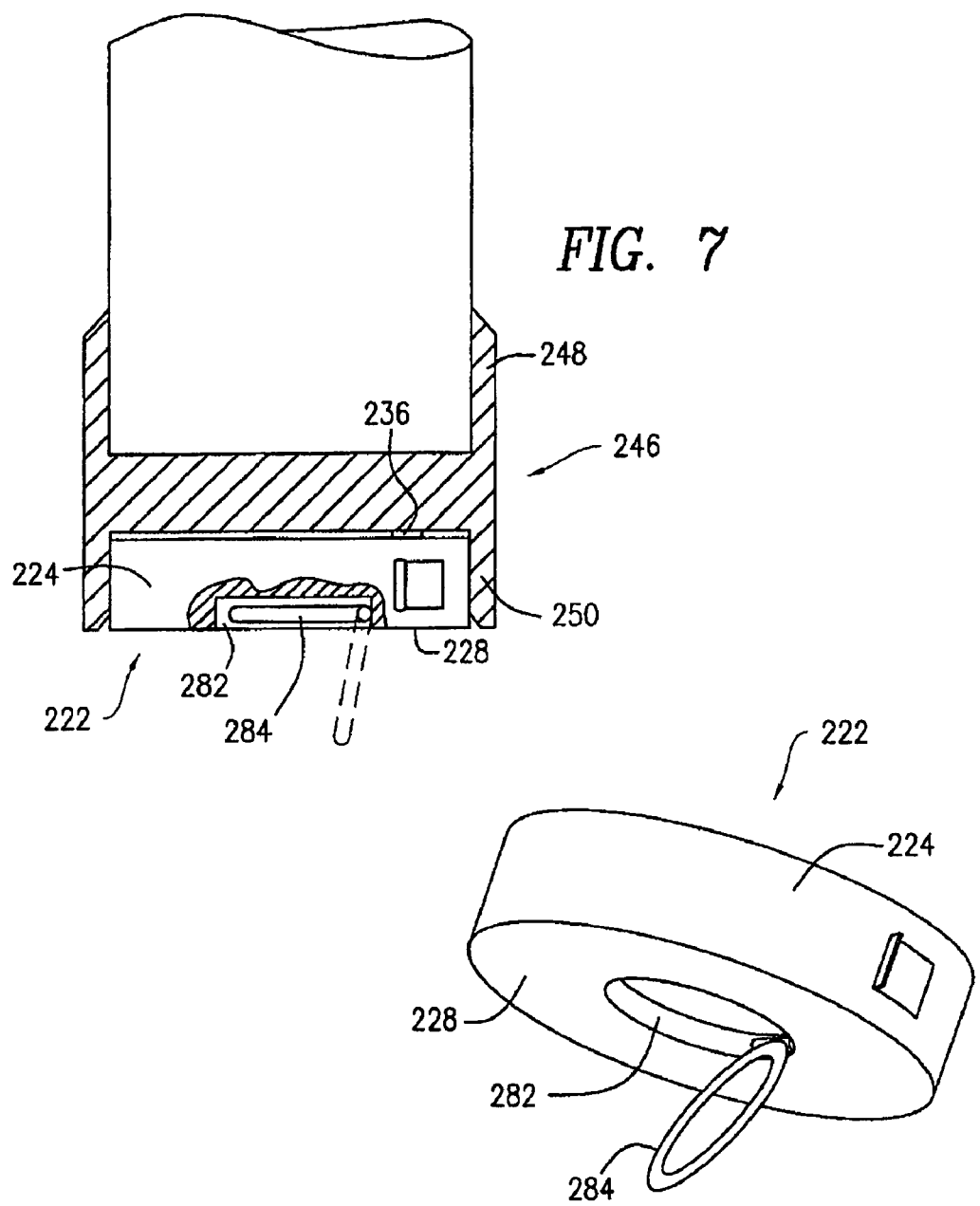
FIG. 7 is a cross-sectional view of a butt cap and a measuring device constructed in accordance with a third embodiment of the present invention.
FIG. 8 is a bottom perspective view of the measuring device shown in FIG. 7.

FIGS. 7 and 8 illustrate a third embodiment of the present invention. The embodiment illustrated in FIGS. 7 and 8 has a construction and operation basically identical to those of the embodiment shown in FIGS. 5 and 6, except as discussed hereinbelow. A butt cap 246 includes a rigid sleeve 248 and a rigid receptacle 250 formed monolithically with each other. A tape measure unit 222 is received in the receptacle 250 by way of a friction fit. The tape measure unit 222 includes a recess 282 formed on an end wall 228 of its housing 224, as well as a tape measure release button 236. A pull ring 284 is pivotally attached to the housing 224 for use in removing the tape measure unit 222 from the receptacle 250. When not in use, the pull ring 284 can be folded and be positioned in the recess 282.

It will be understood that the embodiments described herein are merely exemplary and that a person skilled in the art may make many variations and modifications, including those discussed above, without departing from the spirit and scope of the invention. All such variations and modifications are intended to be included within the scope of the invention.

I claim:

1. A tape measure apparatus comprising:

an adapter having a first sleeve-shaped portion which is sized and shaped so as to be attached to a butt end section of a fishing pole, and a second cup-shaped portion, which defines (i) an upper wall configured and dimensioned to fit within the first sleeve-shaped portion and be attached with respect to said first sleeve-shaped portion and (ii) a substantially circular opening directed away from said upper wall, and bounded by an annular skirt extending from said upper wall;

a tape measure device including a housing with a retractable tape measure wound within, said tape measure having a graduated scale thereon, said housing being configured and dimensioned to fit within the substantially circular opening defined by the second cup-shaped portion of the adapter; and attaching means defined between the annular skirt of the second cup-shaped portion of the adapter and the housing of the tape measure device for removably attaching said housing with respect to said second cup-shaped portion of said adapter such that said housing can be detached readily from said adapter so as to facilitate measuring of a fish that has been caught;

wherein said first sleeve-shaped portion includes an elastic sleeve adapted for receiving the butt end section of the fishing pole; and wherein said elastic sleeve has a flared end; and wherein said second cup-shaped portion is attached to said flared end.

2. The tape measure apparatus according to claim 1, wherein said elastic sleeve is expandable in a radial direction for receiving fishing poles having different diameters.

3. The tape measure apparatus according to claim 1, further comprising a buoyant member mounted with respect to the tape measure device so as to close off the substantially circular opening of the second cup-shaped portion of the adapter.

4. The tape measure apparatus according to claim 1, wherein the upper wall defines a platform comprising a supporting surface having at least one circular recess adapted to receive an end of the butt end section of the fishing pole.

5. The tape measure apparatus according to claim 1, wherein said tape measure device is sized and shaped so as to be oriented substantially perpendicular relative to a longitudinal axis of the fishing pole attached to said first portion.

6. The tape measure apparatus according to claim 1, wherein said attaching means includes a locking tab defined on said housing and a locking hole defined on said annular skirt sized and shaped so as to releasably receive said locking tab.

7. A kit for use with a fishing pole comprising:

an adapter having a first sleeve-shaped portion, which is sized and shaped for attachment to a butt end section of a fishing pole, and a second cup-shaped portion, which defines (i) an upper wall configured and dimensioned to fit within the first sleeve-shaped portion and be attached with respect to said first sleeve-shaped portion and (ii) a substantially circular opening directed away from said upper wall, and bounded by an annular skirt extending from said upper wall;

a tape measure device including a housing with a retractable tape measure wound within, said tape measure having a graduated scale thereon, said housing being configured and dimensioned to fit within the substantially circular opening defined by the second cup-shaped portion of the adapter; and attaching means defined between the annular skirt of the second cup-shaped portion of the adapter and the housing of the tape measure device for removably attaching said housing with respect to said second cup-shaped portion of said adapter such that said housing can be detached readily from said adapter so as to facilitate measuring of a fish that has been caught;

wherein said first sleeve-shaped portion includes an elastic sleeve having a flared end, and wherein said second cup-shaped portion is attached to said flared end.

8. The kit according to claim 7, wherein said tape measure device is sized and shaped so as to be oriented substantially perpendicular relative to a longitudinal axis of the fishing pole attached to said first sleeve-shaped portion.

9. The kit according to claim 7, wherein the upper wall defines a platform comprising a supporting surface having at least one circular recess adapted to receive an end of the butt end section of the fishing pole.

10. The kit according to claim 7, wherein said sleeve is expandable in a radial direction for receiving fishing poles having different diameters.

11. The kit according to claim 7, wherein said attaching means includes a first fastening element provided on said tape measure device and a second fastening element provided on said adapter and releasably engageable with said first fastening element.

12. The kit according to claim 11, wherein said first fastening element includes a locking tab and said second fastening element includes a locking hole sized and shaped so as to releasably receive said locking tab.

13. A fishing pole assembly comprising:

a fishing pole having a butt end;

an adapter having a first sleeve-shaped portion, which is attached to said butt end of said fishing pole, and a second cup-shaped portion, which defines (i) an upper wall configured and dimensioned to fit within the first sleeve-shaped portion and be attached with respect to said first sleeve-shaped portion and (ii) a substantially circular opening directed away from said upper wall, and bounded by an annular skirt extending from said upper wall;

a tape measure device including a housing with a retractable tape measure wound within, said tape measure having a graduated scale thereon, said housing being configured and dimensioned to fit within the substantially circular opening defined by the second cup-shaped portion of the adapter; and attaching means defined between the annular skirt of the second cup-shaped portion of the adapter and the housing of the tape measure device for removably attaching said housing with respect to said second cup-shaped portion of said adapter such that said housing can be detached readily from said adapter so as to facilitate measuring of a fish that has been caught;

wherein said first sleeve-shaped portion includes an elastic sleeve having a flared end, and wherein said second cup-shaped portion is attached to said flared end.

14. The fishing pole assembly according to claim 13, wherein said tape measure device is oriented substantially perpendicular relative to a longitudinal axis of said fishing pole.

15. The fishing pole assembly according to claim 13, wherein said tape measure device includes a buoyant member.

16. The fishing pole assembly according to claim 13, wherein said attaching means includes a first fastening element provided on said tape measure device and a second fastening element provided on said adapter and releasably engageable with said first fastening element.

17. The fishing pole assembly according to claim 16, wherein said first fastening element includes a locking tab and said second fastening element includes a locking hole sized and shaped so as to releasably receive said locking tab.

* * * * *